United States Patent

Saeki

(10) Patent No.: US 9,440,680 B2
(45) Date of Patent: Sep. 13, 2016

(54) VEHICLE COWL STRUCTURE

(71) Applicant: TOYOTA JIDOSHA KABUSHIKI KAISHA, Toyota-shi (JP)

(72) Inventor: Koji Saeki, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/827,529

(22) Filed: Aug. 17, 2015

(65) Prior Publication Data

US 2016/0082900 A1    Mar. 24, 2016

(30) Foreign Application Priority Data

Sep. 22, 2014   (JP) .................................. 2014-192496

(51) Int. Cl.
*B62D 25/08*    (2006.01)
*B60R 21/34*    (2011.01)
*B60R 13/08*    (2006.01)

(52) U.S. Cl.
CPC ......... *B62D 25/081* (2013.01); *B60R 13/0815* (2013.01); *B60R 21/34* (2013.01)

(58) Field of Classification Search
CPC .......... B60R 13/0815; B60R 13/0838; B60R 21/34; B62D 25/081; B62D 25/082
USPC ............................................ 296/187.04, 192
See application file for complete search history.

(56) References Cited

U.S. PATENT DOCUMENTS

2014/0175835 A1*   6/2014   Miyamoto .............. B60R 21/34
                                                         296/192

FOREIGN PATENT DOCUMENTS

FR           2917044 A1 *  12/2008   .......... B62D 25/081
JP         2014-065400        4/2014

* cited by examiner

*Primary Examiner* — Jason S Daniels
(74) *Attorney, Agent, or Firm* — Oblon, McClelland, Maier & Neustadt, L.L.P.

(57) ABSTRACT

There is provided a vehicle cowl structure including: a cowl main body section that forms an S-shaped cross-section configured from an upper side curved portion a lower side curved portion curving, and in which an upper portion extending from the upper side curved portion toward the vehicle front-rear direction rear side is joined to a lower face of a lower end portion of a front windshield, and a lower portion is joined to a dash panel; and a front side reinforcement member that curves to as to bulge out toward the vehicle front-rear direction front side, in which an upper end portion is joined to a location between the upper side curved portion and the lower side curved portion, and a lower end portion is joined to a location between the lower side curved portion and the lower portion joined to the dash panel.

4 Claims, 5 Drawing Sheets

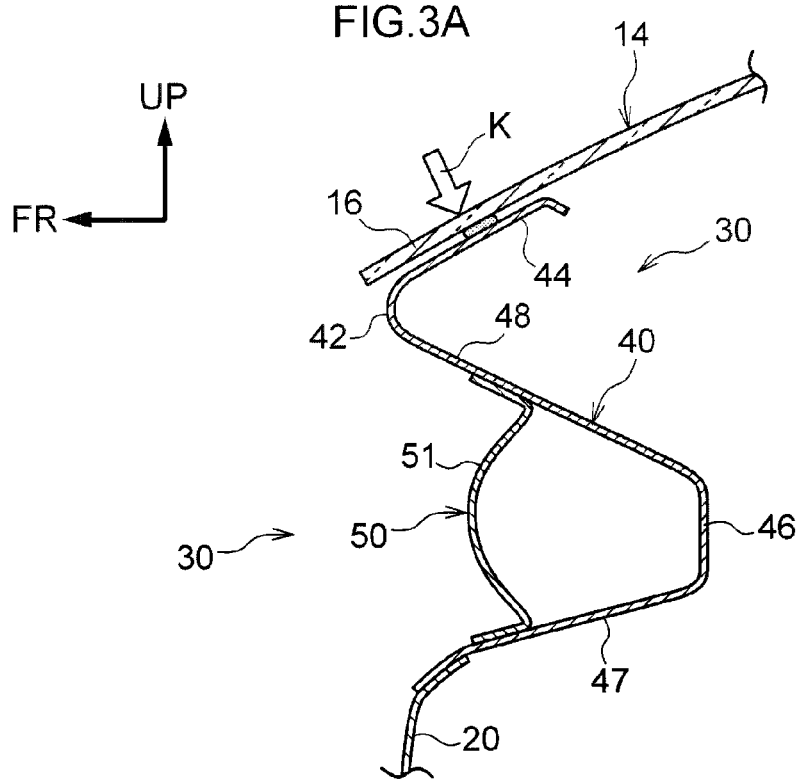
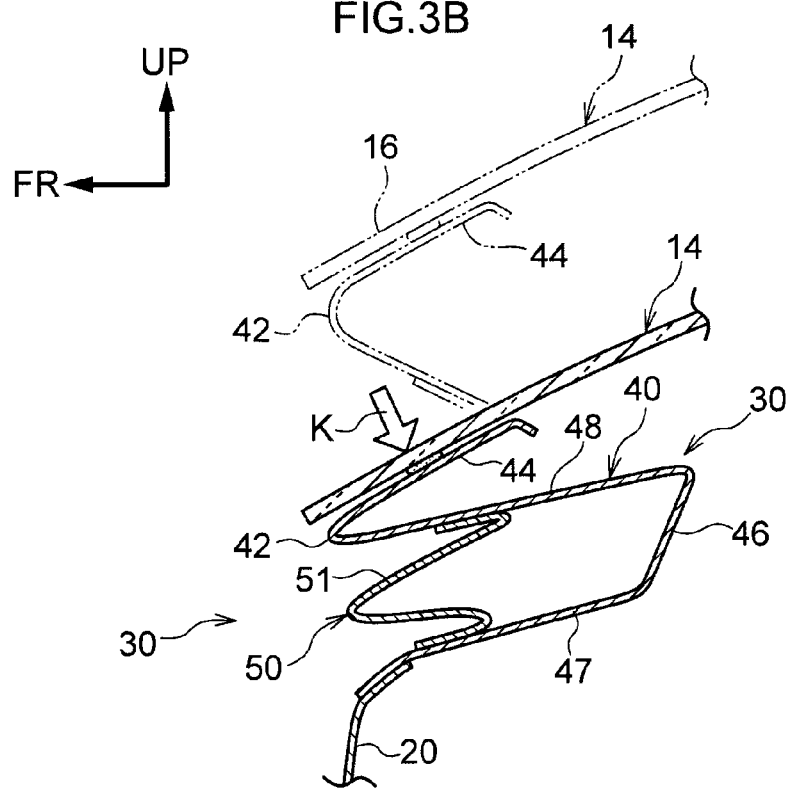

VEHICLE COWL STRUCTURE

CROSS-REFERENCE TO RELATED APPLICATION

This application claims priority under 35 USC 119 from Japanese Patent Application No. 2014-192496 filed on Sep. 22, 2014, the disclosure of which is incorporated by reference herein.

BACKGROUND

1. Technical Field

The present invention relates to a vehicle cowl structure.

2. Related Art

Japanese Patent Application Laid-Open (JP-A) No. 2014-65400 describes technology relating to a cowl section structure of an automobile, including a brace bridging in the up-down direction and joining both sections in the vicinity of an opening portion of a cowl panel that supports a windshield. In this related art, the brace is configured by plural divided brace portions with different plate thicknesses in the up-down direction. The related art describes that both a function of suppressing vibration of the windshield, and a function of absorbing collision force of a collision object, are controlled by setting the brace portions such that the plate thicknesses become thicker on progression from the lower side toward the upper side.

However, in the above related art, the plural brace portions need to be set with different plate thicknesses, and the plural brace portions need to be reliably fastened together, such that the cowl structure is complex, and there is conceivable room for improvement with respect to ease of assembly.

SUMMARY

In consideration of the above circumstances, an object of the present invention is to provide a vehicle cowl structure capable of improving noise and vibration performance (NV performance), while improving ease of assembly.

A first aspect of the present invention provides a vehicle cowl structure including:

a cowl main body section that extends along a vehicle width direction, that forms an S-shaped cross-section configured from an upper side curved portion curving so as to bulge out toward a vehicle front-rear direction front side and a lower side curved portion curving so as to bulge out toward a vehicle front-rear direction rear side, and in which an upper portion extending from the upper side curved portion toward the vehicle front-rear direction rear side is joined to a lower face of a lower end portion of a front windshield, and a lower portion is joined to a dash panel; and a front side reinforcement member that curves to as to bulge out toward the vehicle front-rear direction front side, that is provided at the vehicle front-rear direction front side of the lower side curved portion of the cowl main body section, and in which an upper end portion is joined to a location between the upper side curved portion and the lower side curved portion, and a lower end portion is joined to a location between the lower side curved portion and the lower portion joined to the dash panel.

In the vehicle cowl structure of the first aspect of the present invention, when a colliding body collides with the front windshield and a collision load is input, the cowl main body section and a curved location of the front side reinforcement member undergo bending deformation, and collision load is absorbed.

Since the cowl main body section and the front side reinforcement member are configured as separate members, each member can easily be set with a different natural frequency (resonance frequency). By setting the cowl main body section and the front side reinforcement member with different natural frequencies, each member resonates and absorbs vibrations with respect to vibrations of different frequencies. Noise and vibration performance (NV performance) is thereby improved.

The vehicle cowl structure is configured by joining the cowl main body section and the front side reinforcement member, and since the structure is simplified, ease of assembly is improved.

NV performance is thereby improved while also improving ease of assembly.

Note that "curved" includes bent shapes.

A second aspect of the present invention provides the vehicle cowl structure of the first aspect, wherein:

sound absorbing material with thickness in the vehicle front-rear direction is provided at the vehicle front-rear direction rear side of the cowl main body section; and an upper end portion of the sound absorbing material is disposed in contact with, or in close proximity to, the upper portion of the cowl main body section.

In the vehicle cowl structure of the second aspect of the present invention, the sound absorbing material is provided at the vehicle front-rear direction rear side of the cowl main body section. The sound absorbing material is curved in an S-shape along the cowl main body section, and, in a state in which the upper end portion of the sound absorbing material has its thickness in the vehicle front-rear direction, the sound absorbing material is disposed in contact with, or in close proximity to, the upper portion of the cowl main body section joined to the windshield. The sound absorbing material is thereby disposed with its thickness in the vehicle front-rear direction as far as the vicinity of the windshield, such that an advantageous effect of blocking noise is improved. NV performance is thereby improved.

A third aspect of the present invention provides the vehicle cowl structure of the first aspect or the second aspect, wherein both vehicle width direction side end portions of the cowl main body section are joined to front pillars provided at vehicle width direction outside sections of the vehicle.

In the vehicle cowl structure of the third aspect of the present invention, both vehicle width direction side end portions of the cowl main body section are joined to the front pillars provided at vehicle width direction outside sections of the vehicle. The cowl main body section accordingly performs a function of a cross member, thereby improving body rigidity.

A fourth aspect of the present invention provides the vehicle cowl structure of any one of the first through to third aspects, wherein:

a rear side reinforcement member that extends along the vehicle width direction and curves so as to bulge out toward the vehicle front-rear direction rear side is provided at the vehicle front-rear direction rear side of the lower side curved portion of the cowl main body section; and the rear side reinforcement member is joined to the cowl main body section, and both vehicle width direction side end portions of the rear side reinforcement member are joined to the front pillars provided at both the vehicle width direction outside sections of the vehicle.

In the vehicle cowl structure of the fourth aspect of the present invention, the rear side reinforcement member that extends along the vehicle width direction and curves so as to bulge out toward the vehicle front-rear direction rear side is joined to the cowl main body section, and both vehicle width direction side end portions of the rear side reinforcement member are joined to the front pillars provided at both vehicle width direction outside sections of the vehicle. The rear side reinforcement member accordingly performs a function of a cross member, thereby improving body rigidity.

The first aspect of the present invention enables noise and vibration performance (NV performance) to be improved, while also improving ease of assembly of the vehicle cowl structure.

In the second aspect of the present invention, the advantageous effect of blocking noise is improved using the sound absorbing material.

In the third aspect of the present invention, the cowl main body section performs the function of a cross member, thereby improving the body rigidity.

In the fourth aspect of the present invention, the rear side reinforcement member performs the function of a cross member, thereby improving the body rigidity.

BRIEF DESCRIPTION OF THE DRAWINGS

Exemplary embodiments of the present invention will be described in detail based on the following figures, wherein:

FIG. 3A is a perpendicular cross-section view of a state directly prior to a cowl member undergoing bending deformation when a front end portion of a front windshield is input with collision load, taken along the vehicle front-rear direction;

FIG. 3B is a perpendicular cross-section view of a state when a cowl member has undergone bending deformation due to collision load, taken along the vehicle front-rear direction;

DETAILED DESCRIPTION

Exemplary Embodiment

Figure 1:
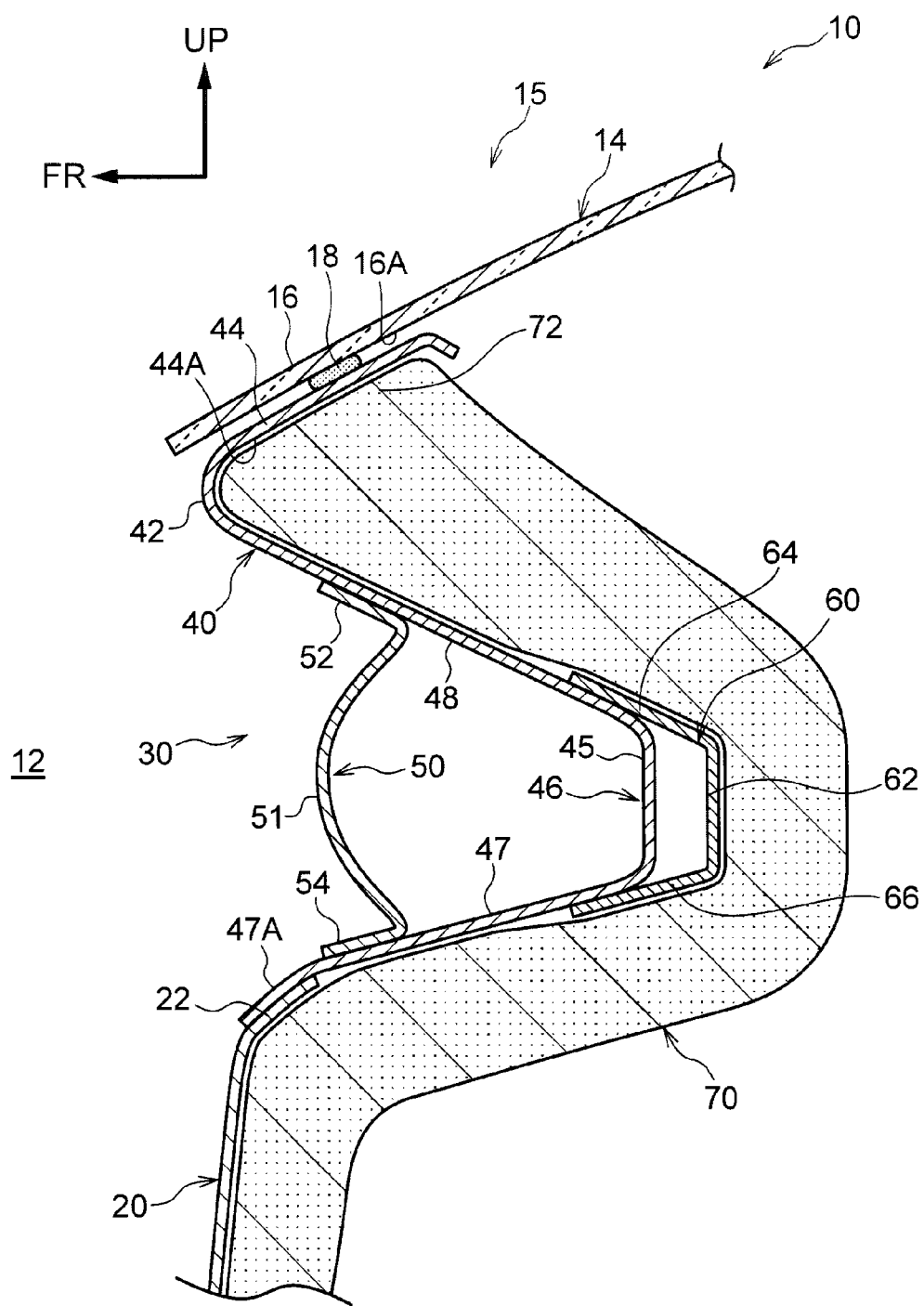
FIG. 1 is perpendicular cross-section view of a vehicle cowl structure according to an exemplary embodiment of the present invention, taken along the vehicle front-rear direction.

Explanation follows regarding an exemplary embodiment of a vehicle cowl structure of the present invention, with reference to FIG. 1 to FIG. 4. Note that in the drawings, the arrow UP indicates the vehicle up-down direction upper side, the arrow FR indicates the vehicle front-rear direction front side, and the arrow OUT indicates the vehicle width direction outside.

As illustrated in FIG. 1, a vehicle cowl structure 15 of the exemplary embodiment of the present invention includes a cowl member 30, a rear side reinforcement member 60, and sound absorbing material 70. The cowl member 30 is provided at the vehicle front-rear direction rear side of an engine room 12 at a vehicle front section of a vehicle 10. The cowl member 30 includes a cowl main body section 40 extending along the vehicle width direction, and a front side reinforcement member (cowl reinforcement) 50. A dash panel 20, partitioning between the engine room 12 and a vehicle cabin, not illustrated in the drawings, is provided at the vehicle up-down direction lower side of the cowl member 30. The rear side reinforcement member 60 is provided at the vehicle front-rear direction rear side of the cowl member 30 (cowl main body section 40).

Figure 2:
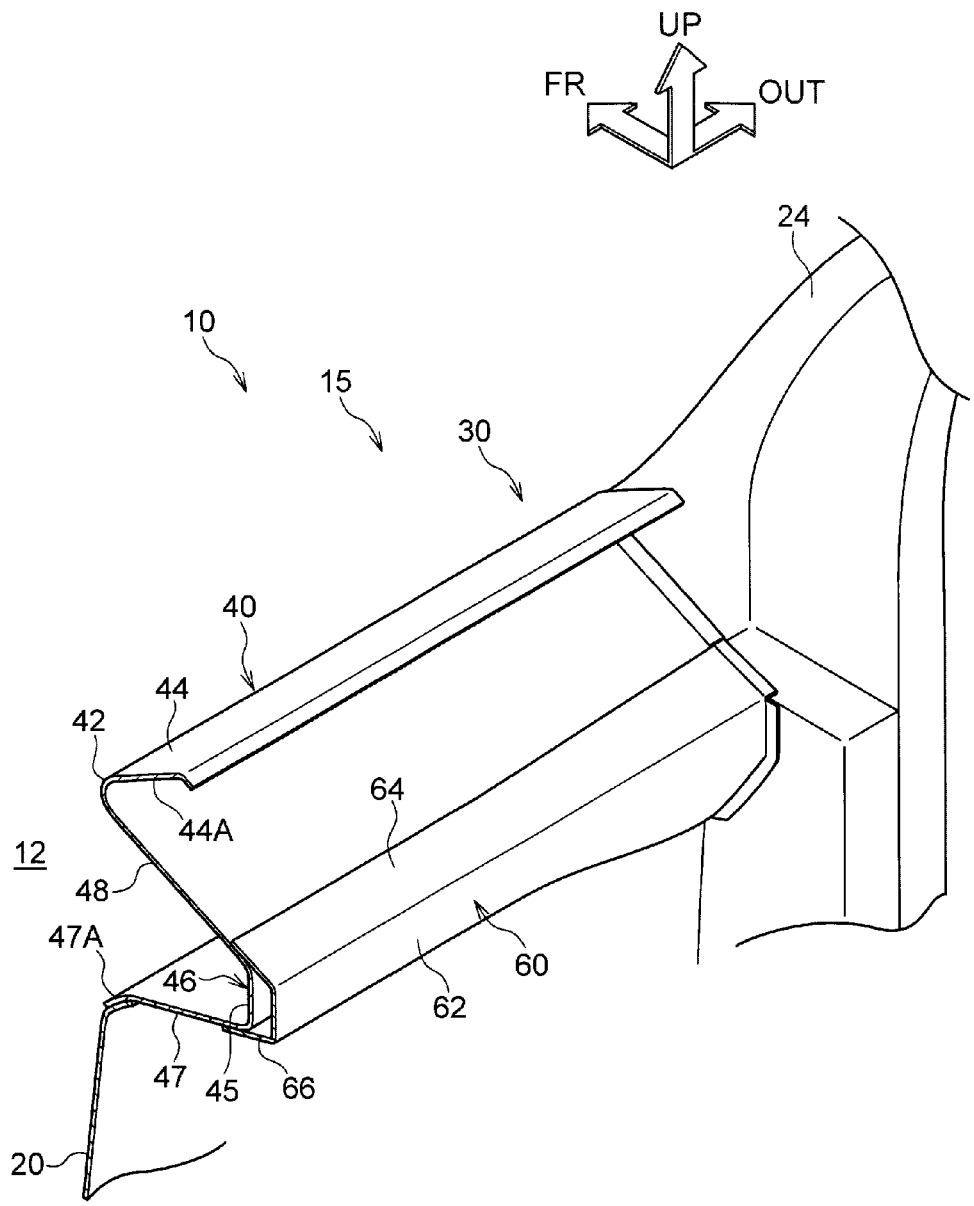
FIG. 2 is a perspective view of relevant portions of the vehicle cowl structure illustrated in FIG. 1, as viewed diagonally from the vehicle rear side.
Figure 4:
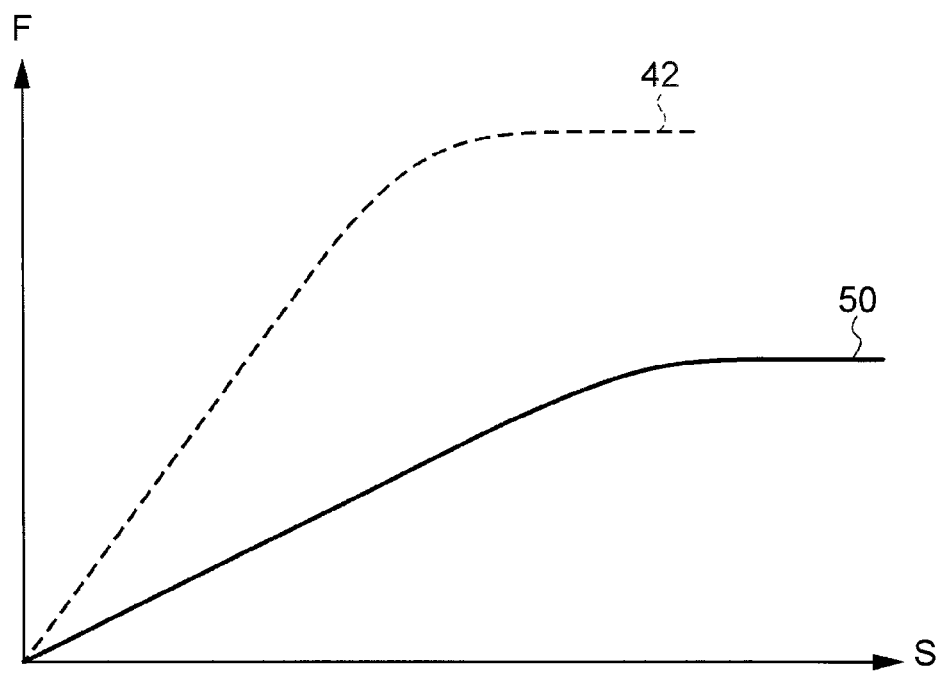
FIG. 4 is a graph illustrating a relationship (spring constant) between a deformation amount (S (stroke)) in the up-down direction of an upper side curved portion configuring a cowl member and a front side reinforcement member, and a load (F)

As illustrated in FIG. 1 and FIG. 2, the cowl main body section 40 is configured as a member made of sheet metal, with an upper side curved portion 42 curving so as to bulge out toward the vehicle front-rear direction front side and a lower side curved portion 46 curving so as to bulge out toward the vehicle front-rear direction rear side, forming a substantially S-shaped cross-section.

As illustrated in FIG. 1, the upper side curved portion 42 of the cowl main body section 40 forms a substantially C-shaped cross-section, and an upper side shelf portion 44 extends from the upper side curved portion 42 along a lower face 16A of a lower end portion 16 of a front windshield 14 (see FIG. 2 also). The lower face 16A of the lower end portion 16 of the front windshield 14 is joined to the upper side shelf portion 44 by adhesive 18. Note that the upper side shelf portion 44 and the front windshield 14 may be configured joined together by a separate member, rather than being configured directly joined together.

As illustrated in FIG. 1 and FIG. 2, the lower side curved portion 46 of the cowl main body section 40 forms a lateral, substantially U-shaped cross-section, with a lower end portion 47A of a lower side shelf portion 47, extending from an upright wall portion 45 (a bottom portion of the U-shape) diagonally downward toward the vehicle front-rear direction front side, joined to an upper end portion 22 of the dash panel 20.

Note that a location between the upper side curved portion 42 and the lower side curved portion 46 of the cowl main body section 40 configures a center side shelf portion 48.

The front side reinforcement member 50 is provided at the vehicle front-rear direction front side of the lower side curved portion 46 of the cowl main body section 40. The front side reinforcement member 50 is a plate shaped member including a front side curved portion 51 with a circular arc shaped cross-section curving so as to bulge out toward the vehicle front-rear direction front side. An upper end portion 52 of the front side reinforcement member 50 is joined to the center side shelf portion 48, and a lower end portion 54 of the front side reinforcement member 50 is joined to the lower side shelf portion 47. Each of the front side reinforcement members 50 is disposed with its plate width direction along the vehicle width direction, and with the front side reinforcement members 50 provided at plural positions along the vehicle width direction, with a separation therebetween.

The rear side reinforcement member 60 is provided at the vehicle front-rear direction rear side of the lower side curved portion 46 of the cowl main body section 40. The rear side reinforcement member 60 is configured as a member made of sheet metal, forming a lateral, substantially U-shaped cross-section curving so as to bulge out toward the vehicle front-rear direction rear side. An upright wall portion 62 (a U-shaped bottom portion) of the rear side reinforcement member 60 is disposed with an interval between the rear side reinforcement member 60 and the upright wall portion 45 of the lower side curved portion 46, and an upper side portion 64 and a lower side portion 66 of the rear side reinforcement member 60 are respectively joined to the center side shelf portion 48 and the lower side shelf portion 47.

As illustrated in FIG. 1, the sound absorbing material 70, that has thickness in the vehicle front-rear direction, is attached to vehicle front-rear direction rear sides of the cowl main body section 40 and the rear side reinforcement member 60. The sound absorbing material 70 curves in a substantially S-shape along the cowl main body section 40 and the rear side reinforcement member 60 in side view, and an upper end portion 72 of the sound absorbing material 70 is disposed in contact with, or in close proximity to, a lower face 44A of the upper side shelf portion 44.

As illustrated in FIG. 2, the lower side shelf portion 47 and the center side shelf portion 48 of the cowl main body section 40, and the rear side reinforcement member 60, abut and are joined to respective front pillars 24 provided at both vehicle width direction side sections of the vehicle 10.

The upper side curved portion 42 with a substantially C-shaped cross-section curving so as to bulge out toward the vehicle front-rear direction front side of the cowl main body section 40 illustrated in FIG. 1, and the front side curved portion 51 of the front side reinforcement member 50 with a circular arc shaped cross-section curving so as to bulge out toward the vehicle front-rear direction front side, both undergo elastic deformation in the up-down direction, namely, both have spring-like properties. As illustrated in the graph in FIG. 4, the upper side curved portion 42 and the front side curved portion 51 are set so as to have different spring constants (spring characteristics).

As illustrated in FIG. 1, the upper side curved portion 42 that has a C-shaped cross-section and spring-like properties is positioned further toward the vehicle front-rear direction front side than an adhesion location (adhesive 18) between the cowl member 30 and the lower end portion 16 of the front windshield 14.

Operation and Advantageous Effects

Explanation follows regarding operation and advantageous effects of the present exemplary embodiment. Note that the rear side reinforcement member 60 and the sound absorbing material 70 are omitted from illustration in FIGS. 3A, 3B, described below.

First, explanation follows regarding absorption performance (collision absorption performance) of a collision load input to the front windshield 14.

As illustrated in FIGS. 3A, 3B, when a colliding body (not illustrated in the drawings) collides with the lower end portion 16 of the front windshield 14, the upper side curved portion 42 and the lower side curved portion 46 of the cowl main body section 40, and the front side reinforcement member 50, each undergoes bending deformation so as to be squashed in the up-down direction, absorbing a collision load K.

The upper side curved portion 42 of the cowl main body section 40 with a C-shaped cross-section, and the front side curved portion 51 of the front side reinforcement member 50 with a circular arc shaped cross-section, each undergoes elastic deformation in the up-down direction, and has spring-like properties. The upper side curved portion 42 (cowl main body section 40) and the front side curved portion 51 (front side reinforcement member 50) each undergoes bending deformation under a low load, such that collision absorption performance is improved, while securing supporting rigidity to support the front windshield 14.

A closed cross-section is formed by the cowl main body section 40 and the front side reinforcement member 50, thereby improving collision absorption performance.

Next, explanation follows regarding noise and vibration (NV) performance (performance to suppress noise and vibration).

The upper side curved portion 42 and the front side curved portion 51 that have spring-like properties each resonate, thereby absorbing vibration. As illustrated in the graph in FIG. 4, in the present exemplary embodiment, the upper side curved portion 42 and the front side curved portion 51 are set with different spring constants (spring characteristics). Namely, the upper side curved portion 42 and the front side reinforcement member 50 are set with different natural frequencies (resonance frequencies).

In the present exemplary embodiment, the upper side curved portion 42 is set with a natural frequency (resonance frequency) so as to resonate with respect to vibration transmitted from the front windshield 14. The front side curved portion 51 (front side reinforcement member 50) is set with a natural frequency (resonance frequency) so as to resonate with respect to vibration transmitted from the engine room 12 (body). Thus, vibration of the front windshield 14 and vibration of the engine room 12 (body) are each effectively absorbed. Noise and vibration performance (NV performance) is thereby improved.

Configuring the upper side curved portion 42 (cowl main body section 40) and the front side curved portion 51 (front side reinforcement member 50) as separate members in this manner enables different natural frequencies (resonance frequencies) to be easily set for each, thereby improving NV performance.

The cowl member 30 is configured by joining the front side reinforcement member 50 to the cowl main body section 40, simplifying the structure, thereby improving ease of assembly.

The cowl member 30 of the present exemplary embodiment accordingly improves NV performance, while also improving ease of assembly. Collision absorption performance is also improved, as described above.

As illustrated in FIG. 1, in the present exemplary embodiment, the sound absorbing material 70, with its thickness in the vehicle front-rear direction, is attached to the vehicle front-rear direction rear sides of the cowl main body section 40 and the rear side reinforcement member 60. The sound absorbing material 70 curves in a substantially S-shape along the cowl main body section 40 and the rear side reinforcement member 60 in side view, and, in a state in which the upper end portion 72 has its thickness in the vehicle front-rear direction, is disposed in contact with, or in close proximity to, the upper side shelf portion 44. NV performance is thereby further improved.

Figure 5:
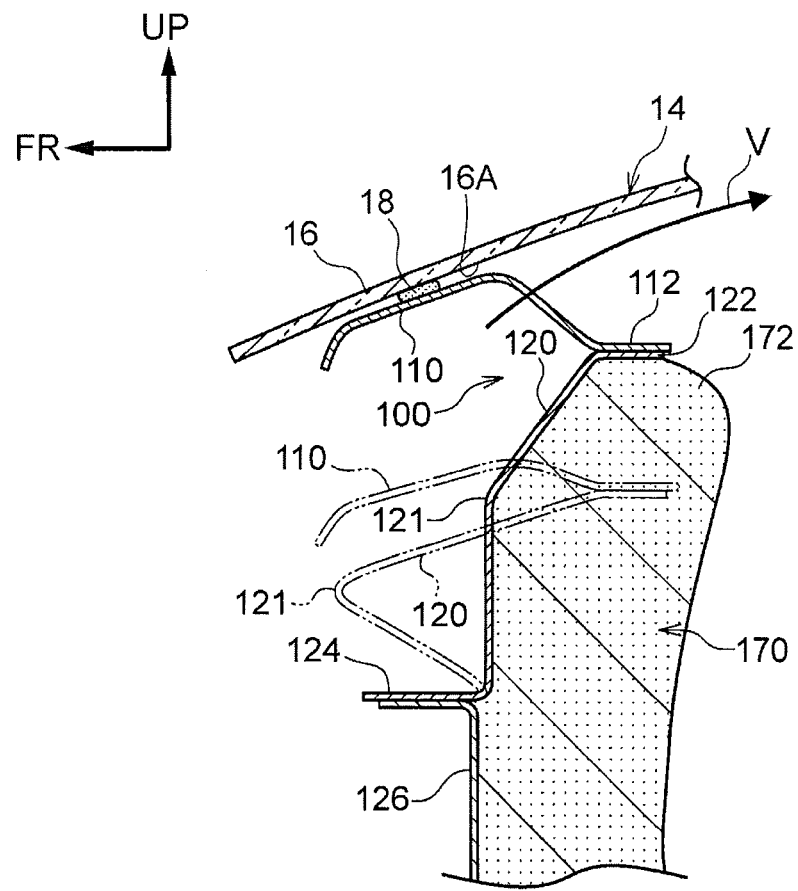
FIG. 5 is a perpendicular cross-section view of a vehicle cowl structure of a Comparative Example, taken along the vehicle front-rear direction.

Explanation follows regarding a vehicle cowl structure illustrated in FIG. 5, serving as a Comparative Example that is not applied with the present invention.

As illustrated in FIG. 5, a cowl member 100 is configured by an upper side cowl member 110 supporting a front windshield 14, and a lower side cowl member 120 formed with a bent portion 121 having a lower end portion 124 joined to a dash panel 126. A rear end portion 112 of the upper side cowl member 100 extending toward the vehicle front-rear direction rear side, and an upper end portion 122 of the lower side cowl member 120 extending toward the vehicle front-rear direction rear side, are joined together.

Note that a hypothetical line (double-dotted dashed line) in FIG. 5 indicates a deformed state of the cowl member 100 (the upper side cowl member 110 and the lower side cowl member 120) during a collision between a lower end portion 16 of the front windshield 14 and a colliding body (omitted from illustration).

In the cowl member 100 of the Comparative Example, an upper end portion 172 of a sound absorbing material 170 is disposed so as to be in contact with, or in close proximity to, a join location between the rear end portion 112 of the upper side cowl member 110 and the upper end portion 122 of the lower side cowl member 120.

There is accordingly an interval between the lower end portion 16 of the front windshield 14 and the upper end portion 172 of the sound absorbing material 170, and noise is not blocked by the sound absorbing material 170 in this interval portion. Sound thereby intrudes into the vehicle cabin side through the interval, as illustrated by the arrow V. A response is accordingly required in order to prevent the intrusion of sound into the vehicle cabin side through the interval (in order to improve NV performance), such as by providing a sound blocking member separately to the sound absorbing material 170.

In contrast thereto, as illustrated in FIG. 1, the cowl member 30 of the present exemplary embodiment forms a substantially S-shaped cross-section, such that, in a state in which the upper end portion 72 of the sound absorbing material 70 has its thickness along the vehicle front-rear direction, the upper end portion 72 can be easily disposed in contact with, or in close proximity to, the lower face 44A of the upper side shelf portion 44. The upper side shelf portion 44 of the cowl member 30 (cowl main body section 40) is joined to the lower end portion 16 of the front windshield 14, and a state is formed in which there is practically no gap between the lower end portion 16 of the front windshield 14 and the upper end portion 72 of the sound absorbing material 70. NV performance is accordingly improved at low cost, while also improving ease of assembly, compared to the cowl member 100 of the Comparative Example.

Next, explanation follows regarding an advantageous effect of improving body rigidity.

As illustrated in FIG. 2, the center side shelf portion 48 and the lower side shelf portion 47 of the cowl main body section 40 of the present exemplary embodiment, and the rear side reinforcement member 60, abut and are joined to the respective front pillars 24 provided at both vehicle width direction side sections of the vehicle 10. The cowl main body section 40 and the rear side reinforcement member 60 accordingly have a function as cross members, thereby improving body rigidity.

The cowl main body section 40 of the present exemplary embodiment accordingly has three functions, these being the function of improving body rigidity, in addition to the collision absorption function and the vibration absorption function (the function of improving NV performance) described above.

Note that, in a hypothetical case in which only the cowl main body section 40 is provided to improve body rigidity without providing the rear side reinforcement member 60, it would be conceivable to make the plate thickness of the cowl main body section 40 thicker in order to increase the rigidity of the cowl main body section 40. However, if the plate thickness of the cowl main body section 40 were made thicker, the load at which the cowl main body section 40 undergoes bending deformation would increase, and there would be a possibility of a reduction in collision absorption performance.

In contrast thereto, by providing the rear side reinforcement member 60 as in the present exemplary embodiment, the body rigidity can be improved without making the plate thickness of the cowl main body section 40 thicker, namely, without reducing collision absorption performance.

Note that the present invention is not limited to the above exemplary embodiment.

In the above exemplary embodiment, for example, the rear side reinforcement member 60 is provided at the vehicle front-rear direction rear side of the lower side curved portion 46 of the cowl main body section 40; however, configuration is not limited thereto. A structure may be applied in which the rear side reinforcement member 60 is not provided.

Moreover, "curved" includes shapes bending in a V-shape.

It goes without saying that various embodiments may be implemented within a range not departing from the spirit of the present invention.

What is claimed is:

1. A vehicle cowl structure comprising:
a cowl main body section that extends along a vehicle width direction, that forms an S-shaped cross-section configured from an upper side curved portion curving so as to bulge out toward a vehicle front-rear direction front side and a lower side curved portion curving so as to bulge out toward a vehicle front-rear direction rear side, and in which an upper portion extending from the upper side curved portion toward the vehicle front-rear direction rear side is joined to a lower face of a lower end portion of a front windshield, and a lower portion is joined to a dash panel; and
a front side reinforcement member that curves so as to bulge out toward the vehicle front-rear direction front side, that is provided at the vehicle front-rear direction front side of the lower side curved portion of the cowl main body section, and in which an upper end portion is joined to a location between the upper side curved portion and the lower side curved portion, and a lower end portion is joined to a location between the lower side curved portion and the lower portion joined to the dash panel.

2. The vehicle cowl structure of claim 1, wherein:
sound absorbing material with thickness in the vehicle front-rear direction is provided at the vehicle front-rear direction rear side of the cowl main body section; and
an upper end portion of the sound absorbing material is disposed in contact with, or in close proximity to, the upper portion of the cowl main body section.

3. The vehicle cowl structure of claim 1, wherein vehicle width direction side end portions of the cowl main body section are joined to front pillars provided at vehicle width direction outside sections of the vehicle.

4. The vehicle cowl structure of claim 1, wherein:
a rear side reinforcement member that extends along the vehicle width direction and curves so as to bulge out toward the vehicle front-rear direction rear side is provided at the vehicle front-rear direction rear side of the lower side curved portion of the cowl main body section; and
the rear side reinforcement member is joined to the cowl main body section, and vehicle width direction side end portions of the rear side reinforcement member are joined to front pillars provided at vehicle width direction outside sections of the vehicle.

* * * * *